May 25, 1926.

J. J. MASCUCH

AUTOMOBILE BUMPER

Filed Oct. 6, 1925

1,585,781

INVENTOR.
Joseph J. Mascuch
BY
M. N. Loughridge
ATTORNEY.

Patented May 25, 1926.

1,585,781

UNITED STATES PATENT OFFICE.

JOSEPH J. MASCUCH, OF EAST ORANGE, NEW JERSEY.

AUTOMOBILE BUMPER.

Application filed October 6, 1925. Serial No. 60,918.

Figure 1:
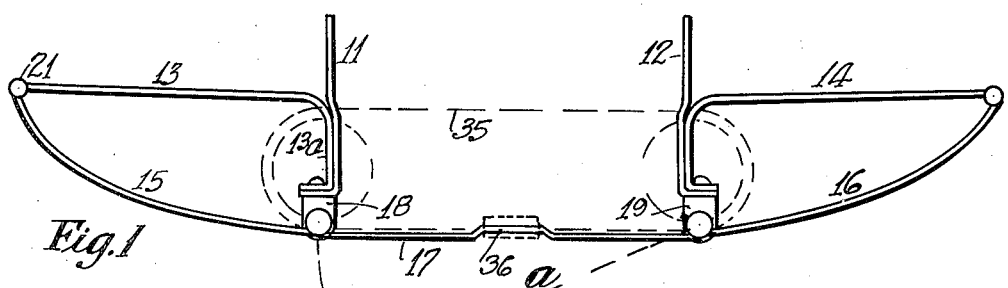
Figure 2:
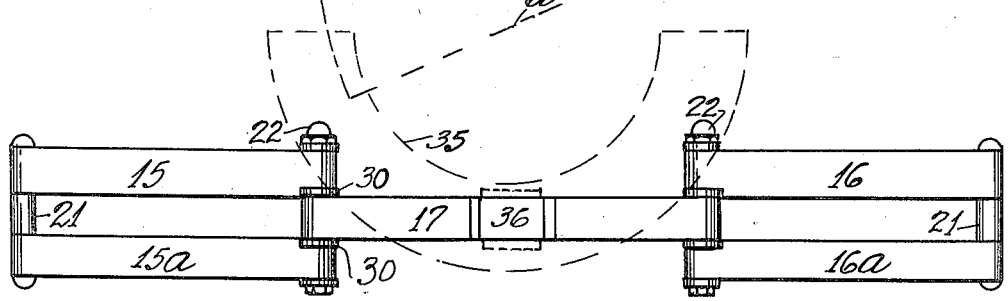
Figure 3:
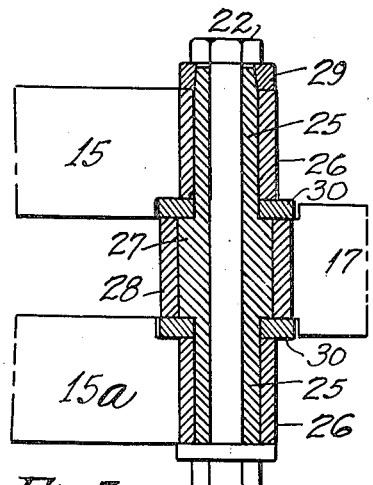
Figure 4:
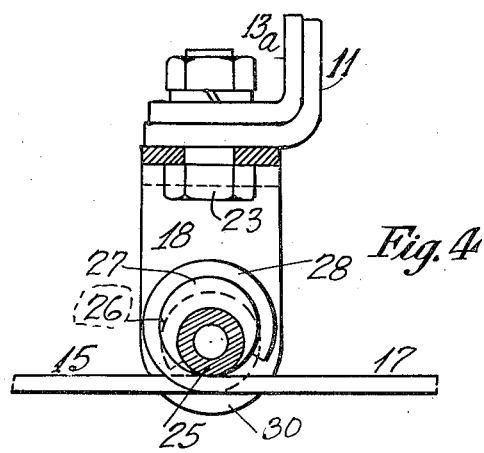
Figure 5:
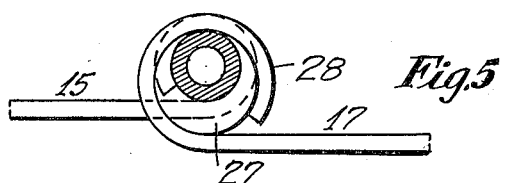
Figure 6:
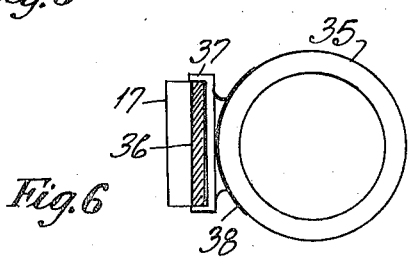

This invention relates to automobile bumpers and particularly to a type of bumper which is constructed in sections with articulated joints and has for an object to provide a bumper in separate sections which are interconnected, to provide a bumper adaptable for the rear of a vehicle with space behind the bumper members for a spare tire, to provide a bumper in which the section opposite the spare tire is movable on its support and to provide a bumper with a movable section which may be used to lock in place a spare tire or other accessory of the vehicle. These and other objects of the invention will be more particularly understood from the following specification and the accompanying drawings in which, Fig. 1 is a plan of a vehicle bumper constructed according to my invention, Fig. 2 is a front elevation corresponding to Fig. 1, Fig. 3 is a detail in section of the connecting post between the articulated members of the bumper, Fig. 4 is another detail partly in section of the supporting bracket, Fig. 5 is a detail showing the movable relation between the impact members of the bumper, and Fig. 6 is a detail, partly in section of a locking mechanism for securing the tire by the bumper.

This invention contemplates the construction of an automobile bumper in three parts comprising two similar outside parts which are independently attached to the vehicle frame and a central section extending between and attached to the outside parts. This central section strengthens the bumper and distributes the impact throughout the bumper. This central section is removable without disturbing the outside sections and may be adjustably positioned with relation to the outside sections. In this way it can be used to engage a locking member for securing a spare tire or other device on the vehicle. The impact members of the bumper form an articulated construction pivotally jointed in which an impact received by one section is transmitted to the adjoining sections.

Referring to the drawings, 11 and 12 are bracket members secured to the automobile frame, 13 is a supporting arm for one of the outside sections of the bumper and 14 is a corresponding arm for the other outside section. In Fig. 1 these arms are bent at a right angle to align with the bracket members as at 13ª. Impact members 15 and 15ª are pivotally secured at 21 to the arm 13 and their opposite ends are secured to bracket 11 by post 22 hereafter described. Similarly, the impact members 16 and 16ª are secured to the arm 14 and to post 22.

A central impact section 17 is connected between posts 22 by a pivotal connection as shown. With this arrangement it will be observed that an impact received by 15 is partially transmitted through 17 to 16 to be resisted by the supporting arm 14. Also, an impact received by 17 is transmitted to 15 and 16 to be partially resisted by the supporting arms 13 and 14. The bracket members 11 and 12 have a certain amount of spring action which yields under these conditions.

The bracket members 11 and 12 are secured, as indicated in Fig. 4 to a U-shaped member 18 by bolt 23. The legs of this member are perforated to receive the stem 25 of the connecting post. The connecting post comprises the stem 25 with an eccentric expansion 27 opposite the impact bar 17. The impact members 15 and 15ª are formed in eyes 26 at the ends to receive the stem 25 and the impact member 17 is formed in an enlarged eye at 28 to receive the section 27 of the stem. The impact bars 15, 15ª and 17 are notched where the eye is formed to provide for the legs 30 of the U-shaped member or shackle 18. The top of stem 25 is provided with hex nut 29 and the connection is held together by the through bolt 22 as shown.

When the eccentric 27 is turned inwards as in Fig. 4 the impact bars 15 and 17 are in alignment. When this eccentric is turned outwards as in Fig. 5, the impact bar 17 projects beyond the bar 15. The impact section 17 is thus adjustable with relation to the sections 15 and 16 by an eccentric motion which is operated by the hex nut 29 through stem 25. This adjustment may be used to apply tension to the impact sections and it may be used for other purposes hereafter described.

It is common practice to carry a spare tire in rear of a vehicle and the construction of this bumper provides space for such a condition. The central impact section 17 extends behind the tire and affords a protection therefor. However, the removal of the tire requires that this section be movable in such a way that the spare tire is available. In certain cases the eccentric adjustment described is sufficient for this purpose and in other cases the impact bar must be removed which I have provided for by hinging it to move like a gate, thus exposing the entire side of the tire.

The spare tire is indicated in outline at 35 which falls in the plane of the impact bar 17. This bar may be kinked at 36 towards the tire and arranged to engage a clasp 37, Fig. 6, which is formed to the contour of the tire or other object at 38, or is otherwise secured to the object. As the bar 17 is moved into alignment with the bars 15 and 16 it engages the clasp 37 and locks the tire in position. When it is moved into the position shown in Fig. 5 the clasp 37 is released and the tire may be removed. Where it is desired to swing the bar 17 outwards like a gate as at a Fig. 1, the stem 25 is made removable and by removing this pivot connection the bar swings on the opposite post. The stem 25 may be made removable by making the eccentric part separate from the ends so that when the bolt 22 is removed these parts are readily separated to release bar 17 to swing on the opposite pivot.

Bumpers constructed according to this invention are made from multiple units any one of which may be easily replaced, they protect the vehicle and the spare tire and prevent the latter from being stolen.

Having thus described my invention, I claim:

1. A vehicle bumper comprising a plurality of impact sections, bracket means securing a pair of said sections to the vehicle and a third impact section pivotally connected with eccentric pivots to said pair.

2. A vehicle bumper comprising a pair of impact members, a bracket for each member securing said members one to each side of the vehicle and an impact bar connecting said members, said bar connected to said brackets with eccentric pivots.

3. A vehicle bumper comprising a plurality of impact sections, bracket means with eyes securing a pair of said sections to the vehicle, a third impact section secured to said eyes between said pair and means for adjusting the position of said third section with relation to said pair.

4. A vehicle bumper as described comprising an impact member consisting of a plurality of impact bars placed vertically in spaced relation terminating in eyes, a supporting bracket secured to the vehicle, a U-shaped member secured to said bracket having its legs aligning with said eyes and perforated to register with said eyes and a bolt scuring said members together.

5. In a vehicle bumper, the combination of a plurality of impact members arranged in a vertical row and terminating in eyes, a flat supporting member secured to the vehicle with legs projecting between said eyes and perforated flatwise to register with said eyes and a bolt for securing said members together.

6. A vehicle bumper as described comprising a connecting post with impact members extending on either side thereof, means securing said post to the vehicle frame and eccentric means associated with said post for adjusting the alignment of said impact members.

7. A vehicle bumper as described comprising a pair of impact members secured one to each side of the vehicle, a third impact member adjustably connecting said pair, a locking device in the plane of said third member and means whereby said third member may be brought into engagement with and disengaged from said locking device.

8. A vehicle bumper as described comprising a pair of impact members secured one to each side of the vehicle, an impact member extending across the vehicle and pivotally secured to said pair, a locking device in the plane of said impact member and means whereby said impact member may be brought into engagement with said locking device.

9. In a vehicle bumper and bracket, the combination of a plurality of impact members arranged in a vertical row and terminating in eyes, a flat member associated with said bracket projecting between said eyes and perforated flatwise to register with said eyes and a bolt for securing said members together.

Signed at Wilkes-Barre, in the county of Luzerne and State of Pennsylvania this twentyfifth day of September, A. D. 1925.

JOSEPH J. MASCUCH.